(12) United States Patent
Herrwerth et al.

(10) Patent No.: US 7,442,666 B2
(45) Date of Patent: Oct. 28, 2008

(54) CATALYTIC SYSTEM FOR THE DEHYDROGENATIVE CONDENSATION OF POLYORGANOSILOXANES WITH ALCOHOLS AND A PROCESS FOR PREPARING ORGANICALLY MODIFIED POLYORGANOSILOXANES

(75) Inventors: Sascha Herrwerth, Essen (DE); Thomas Neumann, Bochum (DE); Isabella Ulrich-Brehm, Ratingen (DE)

(73) Assignee: Goldschmidt GmbH, Essen (DE)

( * ) Notice: Subject to any disclaimer, the term of this patent is extended or adjusted under 35 U.S.C. 154(b) by 302 days.

(21) Appl. No.: 11/205,878

(22) Filed: Aug. 17, 2005

(65) Prior Publication Data
US 2006/0041097 A1 Feb. 23, 2006

(30) Foreign Application Priority Data
Aug. 18, 2004 (DE) .................. 10 2004 039 911

(51) Int. Cl.
*B01J 21/00* (2006.01)
*B01J 31/00* (2006.01)
*B01J 21/02* (2006.01)
(52) U.S. Cl. .................. 502/100; 502/152; 502/202
(58) Field of Classification Search .................. 502/100, 502/202; 528/13, 14
See application file for complete search history.

(56) References Cited

U.S. PATENT DOCUMENTS

| 5,064,802 | A | * | 11/1991 | Stevens et al. | 502/155 |
| 5,153,157 | A | * | 10/1992 | Hlatky et al. | 502/117 |
| 5,204,380 | A | * | 4/1993 | Seyferth et al. | 522/148 |
| 5,296,433 | A | * | 3/1994 | Siedle et al. | 502/117 |
| 5,350,723 | A | * | 9/1994 | Neithamer et al. | 502/104 |
| 5,407,884 | A | * | 4/1995 | Turner et al. | 502/155 |
| 5,527,929 | A | * | 6/1996 | Timmers et al. | 556/7 |
| 5,554,795 | A | * | 9/1996 | Frey et al. | 568/8 |
| 6,482,912 | B2 | * | 11/2002 | Boudjouk et al. | 528/15 |
| 7,053,166 | B2 | * | 5/2006 | Brehm et al. | 528/14 |
| 2003/0139287 | A1 | * | 7/2003 | Deforth et al. | 502/202 |
| 2004/0186260 | A1 | * | 9/2004 | Hohenberg et al. | 528/25 |

FOREIGN PATENT DOCUMENTS

| EP | 277003 A1 | * | 8/1988 |
| EP | 520732 A1 | * | 12/1992 |

* cited by examiner

*Primary Examiner*—Randy Gulakowski
*Assistant Examiner*—Robert Loewe
(74) *Attorney, Agent, or Firm*—Frommer Lawrence & Haug LLP

(57) ABSTRACT

The invention relates to a catalytic system for the dehydrogenative condensation of polyorganosiloxanes with alcohols, consisting of at least one boron compound and at least one synergistically active compound, and to a process for converting polyorganosiloxanes, in which one hydrogen atom bonded to the silicon is replaced by an alkoxide radical using the inventive catalytic system.

20 Claims, No Drawings

CATALYTIC SYSTEM FOR THE DEHYDROGENATIVE CONDENSATION OF POLYORGANOSILOXANES WITH ALCOHOLS AND A PROCESS FOR PREPARING ORGANICALLY MODIFIED POLYORGANOSILOXANES

The invention relates to a catalytic system for the dehydrogenative condensation of polyorganosiloxanes with alcohols, consisting of at least one boron compound and at least one synergistically active compound, and to a process for converting polyorganosiloxanes, in which one hydrogen atom bonded to the silicon is replaced by an alkoxide radical using the inventive catalytic system.

In order to be able to utilize the unique properties of siloxanes in industrial applications, it is usually necessary to modify the siloxane with organic groups, since the pure silicone is generally incompatible with aqueous or organic formulations.

In order to bind organic groups to a siloxane, in principle two different binding types are available. In the first case, a carbon atom is bonded directly to a silicon atom (SiC bond formation); in the second case, a carbon atom is bonded via an oxygen atom to the silicon atom (SiOC bond formation). The SiC bond formation results usually from a hydrosilylation reaction, while several methods are available for the formation of an SiOC bond. Classically, SiOC bonds are formed by the reaction of a siloxane with a leaving group (e.g. halogen) bonded to a silicon atom and an alcohol. Particularly chlorosiloxanes are widely used for this reaction type (U.S. Pat. Nos. 4,301,268, 4,306,050). However, chlorosiloxanes are difficult to handle, since they are extremely reactive. The use of chlorosiloxanes is also associated with the disadvantage that the hydrogen chloride formed in the course of the reaction restricts handling to corrosion-resistant plants and leads to ecological problems. In addition, organic chlorine compounds can be formed in the presence of chlorosiloxanes and alcohols, and are undesirable for toxicological reasons. Furthermore, it is not simple to achieve a quantitative conversion in the reaction of a chlorosilane with an alcohol. Frequently, bases which serve as HCl scavengers have to be used in order to achieve good conversions. Use of these bases results in the formation of large amounts of salt burden which in turn cause problems in their removal on the industrial scale.

As alternative to this process, one possibility is to react alcohols with siloxanes in which hydrogen is bonded directly to the silicon atom (SiH siloxanes). Under suitable conditions, formation of the SiOC bond results only in the elimination of hydrogen and no salt burden occurs. This dehydrogenative condensation proceeds only in the presence of a catalyst.

U.S. Pat. No. 5,147,965 refers to a process which is described in the Japanese patent publication JP-A-4-819941 and in which an SiH siloxane is reacted with an alcohol with addition of alkali metal hydroxides or alkali metal alkoxides. As a disadvantage of this process, it is mentioned that, although these conditions are suitable for catalyzing a dehydrogenative condensation, there is at the same time an equilibration and thus a rearrangement of the basic siloxane skeleton. When the basic siloxane skeleton is not to be changed in the course of the reaction, this method is unsuitable.

In contrast EP-B-0 475 440 describes a process in which SiH siloxanes are reacted with an alcohol with addition of an organic acid in the presence of a Pt salt. Under these conditions, there is no rearrangement of the basic siloxane skeleton. For the reaction, it is, though, unavoidable that large amounts of organic acid (from 0.1 to 1 mol based on alcohol), toluene as a solvent and a platinum salt are used. Since both the toluene and the organic acid are undesired in the end product, they have to be removed on completion of reaction. Platinum salts are not only expensive, but also not entirely safe from a physiological point of view. Specifically in the field of the cosmetics industry, there is a desire for products free of platinum.

Another way to catalyze the dehydrogenative condensation is to use the Grubbs catalyst $Cl_2(PCy_3)_2Ru\!=\!\!CHPh$, in which case 0.5 mol % of the compound is used as the catalyst. This process can work without solvent. Disadvantages of this catalyst are the very high cost and the fact that it is very sensitive toward oxidation, so that it is necessary to work with rigorous exclusion of air. In addition, the catalyst is active not only in the desired dehydrogenative condensation, but also in the homogeneously catalyzed hydrogenation, so that hydrogen formed during the condensation can hydrogenate double bonds present in the substrate (S. V. Maifeld, R. L. Miller, D. Lee Tetrahedron Lett. 2002, 43, 6363-6366).

In addition, the unpublished patent application DE-103 12 634 discloses a process for preparing organically modified polyorganosiloxanes using a catalytic mixture consisting of at least one acid and at least one salt of an acid by bonding hydrosiloxanes to alcohols.

For the preparation of alkoxysilanes by alcoholysis of monomeric hydrosilanes, the literature describes the heterogeneous catalysis of salts, for example potassium tartrate, phthalate or formate. The reactions require the equimolar use of the salts (based on SiH units) and succeed only at high temperatures of approx. 180° C. (J. Boyer, R. J. P. Corriu, R. Perz, C. Reye J. Organomet. Chem. 1978, 157, 153-162). Both the drastic conditions and the large amounts of salt needed make the reaction unattractive for the industrial scale.

In recent years, the literature has reported a further method for the dehydrogenative condensation of monomeric hydrosilanes with alcohols. In this method, tris(pentafluorophenyl) borane is used as a catalyst for the reaction, in which from 1 to 8 mol % of the compound are used as the catalyst and a solvent is employed (J. M. Blackwell, K. L. Foster, V. H. Beck, W. E. Piers J. Org. Chem. 1999, 64, 4887-4892).

In the unpublished patent applications DE-A-103 12 636 and DE-A-103 59 764, technically simple processes are disclosed which allow terminal and/or pendant hydrosiloxanes to be bonded selectively to alcohols without degradation of the siloxane skeleton in a chlorine-free method using boron catalysts. These processes offer many technical advantages and afford excellent products.

However, the procedure described harbors the disadvantage that large amounts of boron catalysts are required for the reaction in many cases. Owing to the high costs of the catalysts used, this results in the circumstance that some of the products achieved cannot be prepared economically. In addition to the high catalyst costs, a large amount of catalyst can also have an adverse effect by virtue of occurrence of opacity in the product. Very high amounts of boron compounds in the product are also not desirable owing to their toxicity and the resulting labeling obligation.

The above-described processes have the additional disadvantage that, in the reactions of especially internal SiH siloxanes with certain hydroxyl-functional compounds (see comparative examples 6, 7), reactions cannot be achieved even when high catalyst concentrations are used.

There is therefore a need to find a technically simple and economically viable process which enables siloxanes to be bonded selectively to alcohols without degradation of the basic siloxane skeleton in a chlorine-free and solvent-free method, in which it is possible to work with distinctly reduced amounts of boron catalysts. In addition, the limitations in the reaction of internal SiH siloxanes with certain alcohols should be overcome.

It has now been found that, surprisingly, a considerable reduction in the amount of boron catalysts can be achieved by use of a catalytic system consisting of at least one boron compound and at least one synergistically active compound. In addition, it has been possible, using the inventive catalytic system, to realize reactions which were not possible with sole use of boron catalysts.

A further advantage is that, when unsaturated or (meth) acrylic ester-containing alcohols are used, no hydrosilylation reactions on SiH groups to form SiC bonds occur using the inventive catalytic system. In addition, when (meth)acrylic ester-containing alcohols are used, there is no Si—OC bond formation via the carbonyl function, as has been described for rhodium, ruthenium and platinum catalysts.

The invention accordingly provides a catalyst for the dehydrogenative condensation of polyorganosiloxanes which contain —Si(H) units and are of the general formula (I)

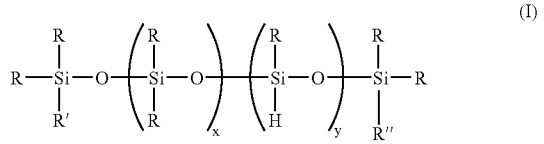

in which
R represents one or more identical or different radicals selected from linear or branched, saturated, mono- or polyunsaturated alkyl, aryl, alkylaryl or arylalkyl radicals having from 1 to 20, in particular from 1 to 10, carbon atoms, haloalkyl groups having from 1 to 20 carbon atoms, in particular from 1 to 10, siloxy groups and triorganosiloxy groups,
R' and R" each independently represent H or R,
x represents an integer from 0 to 300, preferably from 0 to 200 or 5 to 100
y represents an integer from 0 to 100, preferably from 0 to 50, in particular <40 or 3 to 30, with the proviso that at least one hydrogen atom bonded to an Si atom is present in the molecule and is substituted with at least one alcohol which is selected from the group of the linear or branched, saturated, mono- or polyunsaturated, aromatic, fluorinated or perfluorinated, mono- or poly(meth) acrylated, aliphatic-aromatic mono- or polyalcohols, polyether mono- or polyether polyalcohols, amino alcohols, each of which optionally bear other functions and are in particular N-alkyl-, arylamino-EO (ethylene oxide) or -PO (propylene oxide) alcohols. N-alkyl- or arylamino alcohols, and mixtures thereof, which comprises using as a catalyst a catalytic system consisting of at least one boron compound and at least one synergistically active compound, such as salts or complexes with cations selected from the group of elements of transition groups IVA, VIA, VIIA and VIIIA and non-metal group IVB (old IUPAC system).

The cations of the synergistically active compounds of the catalytic system may preferably be titanium, zirconium, chromium, manganese, iron, nickel, palladium and tin.

The anions of the synergistically active compounds of the catalytic system may preferably be alkoxides, acid anions, especially carboxylates, sulfates, nitrates or phosphates, halides, especially chlorides, oxides or complex ligands, especially acetylacetonate or carbonyls.

A preferred embodiment of the invention consists in using, as the boron compound of the catalytic system, fluorinated and/or nonfluorinated organoboron compounds, especially those which are selected from:

$(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(Ph)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14}B)(C_6F_5)$; $(C_6F_5)_2B(OC_2H_5)$; $(C_6F_5)_2B—CH_2CH_2Si(CH_3)_3$;

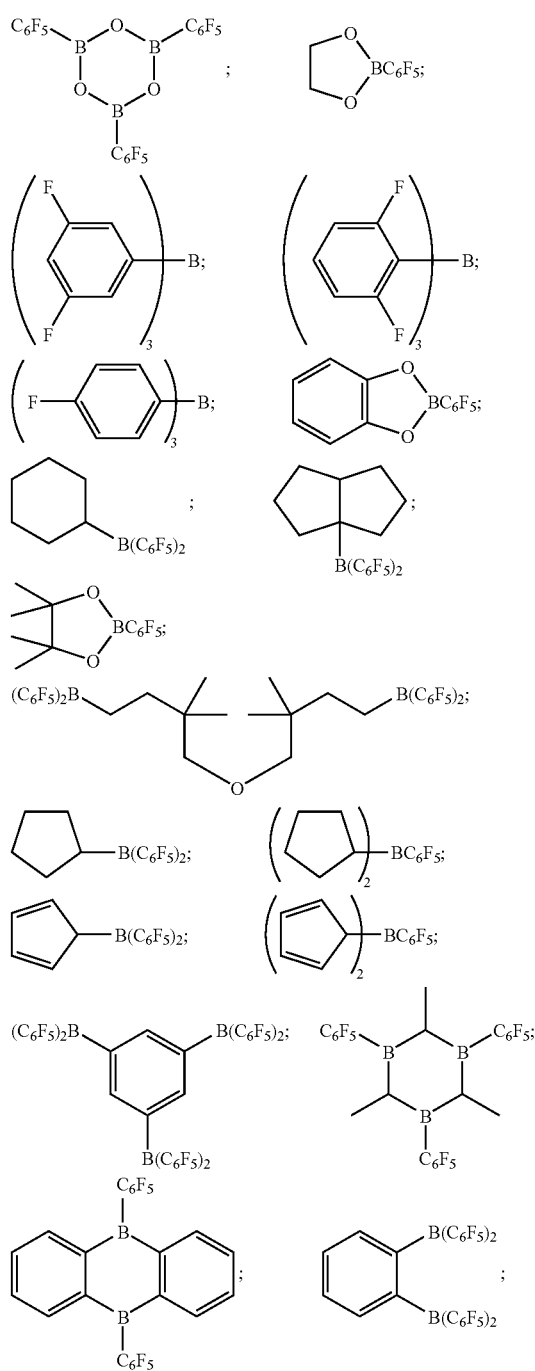

-continued

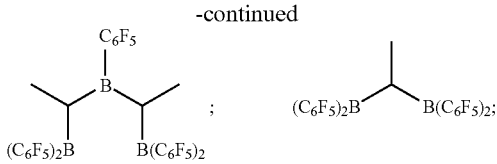

in particular boron trifluoride etherate [109-63-7], borane-triphenylphosphine complex [2049-55-0], triphenylborane [960-71-4], triethylborane [97-94-9] and boron trichloride [10294-34-5], tris(pentafluorophenyl)boroxin [223440-98-0], 4,4,5,5,-tetramethyl-2-(pentafluorophenyl)-1,3,2-dioxaborolane [325142-81-2], 2-(pentafluorophenyl)-1,3,2-dioxaborolane [336880-93-4], bis(pentafluorophenyl)cyclohexylborane [245043-30-5], di-2,4-cyclopentadien-1-yl (pentafluorophenyl)borane [336881-03-9], (hexahydro-3a (1H)-pentalenyl)bis(pentafluorophenyl)borane [336880-98-9], 1,3-[2-[bis(pentafluorophenyl)boryl]ethyl] tetramethyldisiloxane [336880-99-0], 2,4,6-tris (pentafluorophenyl)borazine [1110-39-0], 1,2-dihydro-2-(pentafluorophenyl)-1,2-azaborine [336880-94-5], 2-(pentafluorophenyl)-1,3,2-benzodioxaborole [336880-96-7], tris(4-trifluoromethoxyphenyl)borane [336880-95-6], tris (3-trifluoromethylphenyl)borane [24455-00-3], tris(4-fluorophenyl)borane [47196-74-7], tris(2,6-difluorophenyl) borane [146355-09-1], tris(3,5-difluorophenyl)borane [154735-09-8], methyliumtriphenyl tetrakis(pentafluorophenyl)borate [136040-19-2], N,N-dimethylanilinium tetrakis (pentafluorophenyl)borate, more preferably tris(pentafluorophenyl)borane, and mixtures of the above boron compounds.

The invention further provides a process for the partial or full reaction of one or more polyorganosiloxanes containing —Si(H) units and are of the general formula (I)

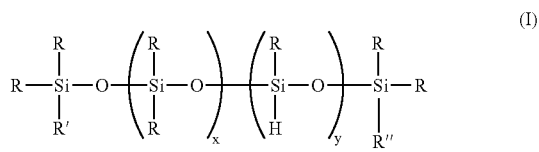

in which
R represents one or more identical or different radicals selected from linear or branched, saturated, mono- or polyunsaturated alkyl, aryl, alkylaryl or arylalkyl radicals having from 1 to 20, in particular from 1 to 10, carbon atoms, haloalkyl groups having from 1 to 20 carbon atoms, in particular 1 to 10, siloxy groups and triorganosiloxy groups,
R' and R" each independently represent H or R,
x represents an integer from 0 to 300, preferably from 0 to 200 or 5 to 100,
y represents an integer from 0 to 100, preferably from 0 to 50, in particular <40 or 3 to 30, with the proviso that at least one hydrogen atom bonded to an Si atom is present in the molecule and is substituted with at least one alcohol which is selected from the group of the linear or branched, saturated, mono- or polyunsaturated, aromatic, fluorinated or perfluorinated, mono- or poly(meth) acrylated, aliphatic-aromatic mono- or polyalcohols, polyether mono- or polyether polyalcohols, amino alcohols, in particular N-alkyl-, arylamino-EO or —PO alcohols, N-alkyl- or arylamino alcohols, and mixtures thereof, which comprises replacing the hydrogen present in the Si(H)(R)—O units of the polyorganosiloxane, optionally under inert gas, optionally with use of solvents, partly or fully by alkoxide radicals of the alcohols used, in one process step using the inventive catalytic system at temperatures of from about 70° C. to about 150° C.

The reaction of the terminal and/or pendant Si—H-functional siloxanes with the above-defined alcohols using the inventive catalytic system is carried out by the following general synthetic method:

the alcohol is initially charged with or without solvent and with the inventive catalytic system, possibly under protective gas, and heated to from approx. 70° C. to approx. 150° C. Subsequently, the Si—H-functional siloxane is added dropwise and the reaction mixture stirred up to completion of the reaction. The reaction may be modified such that the alcohol, the inventive catalytic system and the Si—H-functional siloxane are initially charged with or without solvent and heated to reaction temperature (one-pot reaction).

In addition, these reactions may be carried out using protective gas, lean air or inhibitors.

In this procedure, the sequence of addition of the inventive boron compounds and synergistically active compounds is freely selectable. In addition, the inventive catalytic system may be prepared separately in a suitable medium (solvents, reactants) and be used in the reaction.

Surprisingly, when the inventive catalytic system is used, an amount of boron compounds greatly reduced in comparison to the sole use of boron compounds is sufficient to achieve a reaction.

In addition, it is surprisingly possible using the inventive catalytic system to carry out reactions of SiH siloxanes with certain hydroxyl-functional compounds which cannot be achieved with sole use of boron compounds (see inventive examples 19, 20).

This is all the more surprising since the inventive compounds which act synergistically with the boron compounds in themselves do not have any catalytic activity in the dehydrogenative condensation.

In the process according to the invention, it is possible in principle to use any organic compound having alcoholic hydroxyl groups, including the simple alcohols and their alkoxylation products, the diols, triols, polyols, amino alcohols and, for example, hydroxy carboxylic acids and their particular derivatives. Particular preference is given to ethanol and to propylene oxide- or ethylene oxide-functionalized polyether alcohols which have been started, for example, with butyl alcohol, allyl alcohol or nonylphenol, fluorinated and perfluorinated alcohols and mono- or poly(meth)acrylated mono- or polyalcohols.

The alcohol is preferably used in an equimolar amount or in excess; in the process according to the invention, particular preference is given to establishing the ratio of SiH groups to alcohol groups in the range from about 1:1 to about 1:3 molar equivalents.

It is possible directly by the process according to the invention also to prepare partly substituted polyorganosiloxanes which, in addition to the substituted Si—OC units, still have unconverted Si(H) units. To this end, the ratio of SiH groups to alcohol groups is preferably established in the range from about 1:0.1 to about 1:0.99 molar equivalents.

The inventive polysiloxanes modified via dehydrogenative condensation may be prepared in a single synthetic stage in different chain lengths and/or modification types, since the preparation proceeds without the degradation of the basic siloxane skeleton.

For tailored products, it is also possible that, before the reaction of the alcohols with the Si—H siloxanes using the inventive catalyst system, any other reaction with a portion of the hydrogen atoms of the Si—H siloxane is carried out, in this context specifically a hydrosilylation.

In order to suppress the side reaction of Si—H to Si—OH, it is advantageous to dry the alcohols used before use, especially when polyether alcohols are used. This may be effected by known processes, for example by using desiccants or vacuum distillation.

Polyorganosiloxanes used in the process according to the invention may be purely terminal, i.e. Si—H groups are disposed only on the head groups of the polysiloxane chain, purely pendant, i.e. Si—H groups are disposed only in the interior, but not at the head groups of the polysiloxane chain, or mixed.

In the same way and with very particular preference, it is possible in the process according to the invention to use pendant, α,ω-disubstituted and mixed polydimethylhydrosiloxanes of the general formula (I).

Very particular preference is given, for example, to the use of polyorganosiloxanes of the following formula (II)

$$M\text{-}O\text{-}D_x\text{-}D'_y\text{-}M \quad (II)$$

where

M is trialkylsilyl, in particular trimethylsilyl,
D is dialkylsilyloxy, in particular dimethylsilyloxy, and
D' is

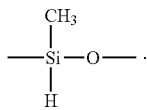

Very particular preference is likewise given, for example, to the use of polyorganosiloxanes of the following formula (III)

$$M'\text{-}O\text{-}D_x\text{-}M' \quad (III)$$

in which

M' is dialkyl(hydro)silyl, in particular dimethylhydrosilyl, and
D is dialkylsilyloxy, in particular dimethylsilyloxy.

Very particular preference is likewise given, for example, to the use of polyorganosiloxanes of the following formula (IV)

$$M'\text{-}O\text{-}D_x\text{-}D'_y\text{-}M' \quad (IV)$$

where

M' is dialkyl(hydro)silyl, in particular dimethylhydrosilyl,
D is dialkylsilyloxy, in particular dimethylsilyloxy, and
D' is

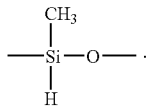

The process according to the invention may be carried out without solvent, which is advantageous especially for the industrial scale realization from economic and ecological aspects.

Consequently, in the effort to overcome the disadvantages of the prior art, a novel catalytic system has been provided for a process which enables the bonding of alcohols to SiH siloxanes using distinctly reduced amounts of boron compounds. In addition, it has been possible to achieve reactions of alcohols with SiH siloxanes using the inventive catalytic system, which were not possible with sole use of boron compounds.

The inventive polyorganosiloxanes can be used for the finishing of textiles, antiadhesive release coatings, UV-curing coatings, as additives for UV-curing coatings, as additives for plastics, coatings, printing inks and for cosmetic formulations, or in the masonry paints field, and/or as polyurethane foam stabilizers.

EXAMPLES

The examples which follow are intended to illustrate the invention, but do not constitute any restriction whatsoever.

Comparative Examples A

To illustrate the use amount of tris(pentafluorophenyl)borane without synergistically active compound, the following experiments were carried out, employing a sufficient amount of tris(pentafluorophenyl)borane in (a) and an inadequate amount in (b):

1a. reaction of a terminally Si—H-functional siloxane (x=7.2, y=0, R' and R"=H) with Isofol 12 (Sasol) using a sufficient amount of tris(pentafluorophenyl)borane:
  37.4 g of Isofol 12 (Sasol) are heated to 120° C. in a four-neck flask equipped with stirrer, intensive cooler, thermometer and dropping funnel, together with 0.01 g (100 ppm) of tris(pentafluorophenyl)borane catalyst. When the temperature has been attained, 62.6 g of terminally Si—H-functionalized polydimethylsiloxane (x=7.2, y=0, R' and R"=H) of the general formula HMe$_2$SiO(SiMe$_2$O)$_{7.2}$SiMe$_2$H (SiH value: 0.302%) are added dropwise within 20 minutes. One hour after completion of addition and cooling, the conversion, according to the SiH value method, was 100%.
  After the volatile compounds have been distilled off, a colorless, clear liquid is obtained.

1b. Reaction of a terminally Si—H-functional siloxane (x=7.2, y=0, R' and R"=H) with Isofol 12 (Sasol) using an insufficient amount of tris(pentafluorophenyl)borane (cf. 10, 11):
  37.4 g of Isofol 12 (Sasol) are heated to 120° C. in a four-neck flask equipped with stirrer, intensive cooler, thermometer and dropping funnel, together with 0.002 g (20 ppm) of tris(pentafluorophenyl)borane catalyst. When the temperature has been attained, 62.6 g of terminally Si—H-functionalized polydimethylsiloxane (x=7.2, y=0, R' and R"=H) of the general formula HMe$_2$SiO(SiMe$_2$O)$_{7.2}$SiMe$_2$H (SiH value: 0.302%) are added dropwise within 20 minutes. One hour after completion of addition and cooling, the conversion, according to the SiH value method, was 0%.

2a. Reaction of a terminally Si—H-functional siloxane (x=13, y=0, R' and R"=H) with a polypropylene oxide polyether using a sufficient amount of tris(pentafluorophenyl)borane:
  75.6 g of a butanol-started polypropylene oxide polyether (average molar mass 1800 g/mol) are heated to 120° C.

in a four-neck flask equipped with stirrer, reflux condenser, thermometer and dropping funnel, together with 0.012 g (120 ppm) of tris(pentafluorophenyl)boran catalyst. After the temperature has been attained, 24.3 g of terminally Si—H-functionalized polydimethylsiloxane (x=13, y=0, R' and R"=H) of the general formula $HMe_2SiO(SiMe_2O)_{13}SiMe_2H$ (SiH value: 0.183%) are added dropwise within 20 minutes. One hour after completion of addition and cooling, the conversion, according to the SiH value method, was 100%.

2b. Reaction of a terminally Si—H-functional siloxane (x=13, y=0, R' and R"=H) with a polypropylene oxide polyether using an insufficient amount of tris(pentafluorophenyl)borane (cf. 12):

75.6 g of a butanol-started polypropylene oxide polyether (average molar mass 1800 g/mol) are heated to 120° C. in a four-neck flask equipped with stirrer, reflux condenser, thermometer and dropping funnel, together with 0.001 g (10 ppm) of tris(pentafluorophenyl)boran catalyst. After the temperature has been attained, 24.3 g of terminally Si—H-functionalized polydimethylsiloxane (x=13, y=0, R' and R"=H) of the general formula $HMe_2SiO(SiMe_2O)_{13}SiMe_2H$ (SiH value: 0.183%) are added dropwise within 20 minutes. One hour after completion of addition and cooling, the conversion, according to the SiH value method, was 0%.

3a. Reaction of an internally Si—H-functional siloxane (x=13, y=5, R' and R"=Me) with 2-ethylhexanol (Fluka) using a sufficient amount of tris(pentafluorophenyl)borane:

32.5 g of 2-ethylhexanol (Fluka) are heated to 120° C. in a four-neck flask equipped with stirrer, intensive cooler, thermometer and dropping funnel, together with 0.03 g (300 ppm) of tris(pentafluorophenyl)borane catalyst. When the temperature is attained, 67.5 g of internally Si—H-functionalized polydimethylsiloxane (x=13, y=5, R' and R"=Me) of the general formula $Me_3SiO(SiHMeO)_5(SiMe_2O)_{13}SiMe_3$ (SiH value: 0.353%) are added dropwise within 20 minutes. One hour after completion of addition and cooling, the conversion, according to the SiH value method, was 100%.

After the volatile compounds have been distilled off, a colorless, clear liquid is obtained.

3b. Reaction of an internally Si—H-functional siloxane (x=13, y=5, R' and R"=Me) with 2-ethylhexanol (Fluka) using an insufficient amount of tris(pentafluorophenyl)borane (cf. 13, 14):

32.5 g of 2-ethylhexanol (Fluka) are heated to 120° C. in a four-neck flask equipped with stirrer, intensive cooler, thermometer and dropping funnel, together with 0.006 g (60 ppm) of tris(pentafluorophenyl)borane catalyst. When the temperature has been attained, 67.5 g of internally Si—H-functionalized polydimethylsiloxane (x=13, y=5, R' and R"=Me) of the general formula $Me_3SiO(SiHMeO)_5(SiMe_2O)_{13}SiMe_3$ (SiH value: 0.353%) are added dropwise within 20 minutes. One hour after completion of addition and cooling, the conversion, according to the SiH value method, was 0%.

4a. Reaction of an internally Si—H-functional siloxane (x=13, y=5, R' and R"=Me) with 2-hydroxyethyl acrylate ($CH_2$=CH—C(O)—O—$CH_2$—$CH_2$—OH) using a sufficient amount of tris(pentafluorophenyl)borane:

121.9 g of 2-hydroxyethyl acrylate are heated to 110° C. in a four-neck flask equipped with stirrer, intensive cooler, thermometer and dropping funnel, together with 0.384 g (943 ppm) of tris(pentafluorophenyl)borane catalyst and 300 ppm of methylhydroquinone. When the temperature has been attained, 285.5 g of internally Si—H-functionalized polydimethylsiloxane (x=13, y=5, R' and R"=Me) of the general formula $Me_3SiO(SiHMeO)_5(SiMe_2O)_{13}SiMe_3$ (SiH value: 0.353%) are added dropwise within 20 minutes. One hour after completion of addition and cooling, the conversion, according to the SiH value method, was 100%.

After the volatile compounds have been distilled off, a colorless, clear liquid is obtained.

4b. Reaction of an internally Si—H-functional siloxane (x=13, y=5, R' and R"=Me) with 2-hydroxyethyl acrylate ($CH_2$=CH—C(O)—O—$CH_2$—$CH_2$—OH) using an insufficient amount of tris(pentafluorophenyl)borane (cf. 15, 16, 17):

121.9 g of 2-hydroxyethyl acrylate are heated to 110° C. in a four-neck flask equipped with stirrer, intensive cooler, thermometer and dropping funnel, together with 0.19 g (466 ppm) of tris(pentafluorophenyl)borane catalyst and 300 ppm of methylhydroquinone. When the temperature has been attained, 285.5 g of internally Si—H-functionalized polydimethylsiloxane (x=13, y=5, R' and R"=Me) of the general formula $Me_3SiO(SiHMeO)_5(SiMe_2O)_{13}SiMe_3$ (SiH value: 0.353%) are added dropwise within 20 minutes. One hour after completion of addition and cooling, the conversion, according to the SiH value method, was 0%.

5a. Reaction of an internally Si—H-functional siloxane (x=63.5, y=6.5, R' and R"=Me) with a polypropylene oxide polyether using a sufficient amount of tris(pentafluorophenyl)borane:

40.0 g of a butanol-started polypropylene oxide polyether (average molar mass 1800 g/mol) are heated to 120° C. in a four-neck flask equipped with stirrer, reflux condenser, thermometer and dropping funnel, together with 0.016 g (300 ppm) of tris(pentafluorophenyl)borane catalyst. After the temperature has been attained, 14.5 g of internally Si—H-functionalized polydimethylsiloxane (x=63.5, y=6.5, R' and R"=Me) of the general formula $Me_3SiO(SiHMeO)_{6.5}(SiMe_2O)_{63.5}SiMe_3$ (SiH value: 0.13%) are added dropwise within 20 minutes. One hour after completion of addition and cooling, the conversion, according to the SiH value method, was 100%.

5b. Reaction of an internally Si—H-functional siloxane (x=63.5, y=6.5, R' and R"=Me) with a polypropylene oxide polyether using an insufficient amount of tris(pentafluorophenyl)borane (cf. 18):

40.0 g of a butanol-started polypropylene oxide polyether (average molar mass 1800 g/mol) are heated to 120° C. in a four-neck flask equipped with stirrer, reflux condenser, thermometer and dropping funnel, together with 0.006 g (120 ppm) of tris(pentafluorophenyl)borane catalyst. After the temperature has been attained, 14.5 g of internally Si—H-functionalized polydimethylsiloxane (x=63.5, y=6.5, R' and R"=Me) of the general formula $Me_3SiO(SiHMeO)_{6.5}(SiMe_2O)_{63.5}SiMe_3$ (SiH value: 0.13%) are added dropwise within 20 minutes. One hour after completion of addition and cooling, the conversion, according to the SiH value method, was 0%.

Comparative Examples B

Reactions which were not realizable with sole use of tris (pentafluorophenyl)borane:

6. Reaction of an internally Si—H-functional siloxane (x=63.5, y=6.5, R' and R"=Me) with a polyether which is composed of propylene oxide and ethylene oxide, using tris(pentafluorophenyl)borane (cf. 19):

40.8 g of a butanol-started polyether (average molar mass 1400 g/mol) which contains 58% propylene oxide (remainder ethylene oxide) are heated to 120° C. in a four-neck flask equipped with stirrer, reflux condenser, thermometer and dropping funnel, together with 0.039 g (950 ppm) of tris(pentafluorophenyl)borane catalyst. After the temperature has been attained, 20.0 g of internally Si—H-functionalized polydimethylsiloxane (x=63.5, y=6.5, R' and R"=Me) of the general formula Me$_3$SiO(SiHMeO)$_{6.5}$(SiMe$_2$O)$_{63.5}$SiMe$_3$ (SiH value: 0.13%) are added dropwise within 20 minutes. Four hours after completion of addition, according to the SiH value method, there is still no conversion.

7. Reaction of an internally Si—H-functional siloxane (x=63.5, y=6.5, R' and R"=Me) with a polyether which is composed of propylene oxide and ethylene oxide, using tris(pentafluorophenyl)borane (cf. 20):

85.0 g of a butanol-started polyether (average molar mass 4400 g/mol) which contains 58% propylene oxide (remainder ethylene oxide) are heated to 120° C. in a four-neck flask equipped with stirrer, reflux condenser, thermometer and dropping funnel, together with 0.2 g (2.00 ppm) of tris(pentafluorophenyl)borane catalyst. After the temperature has been attained, 15.0 g of terminally Si—H-functionalized polydimethylsiloxane (x=63.5, y=6.5, R' and R"=Me) of the general formula Me$_3$SiO(SiHMeO)$_{6.5}$(SiMe$_2$O)$_{63.5}$SiMe$_3$ (SiH value: 0.13%) are added dropwise within 20 minutes. Four hours after completion of addition, according to the SiH value method, there is still no conversion.

Comparative Examples C

Attempted reactions with sole use of the synergistically active compounds:

8. Attempted reaction of an internally Si—H-functional siloxane (x=13, y=5, R' and R"=Me) with 2-hydroxyethyl acrylate (CH$_2$=CH—C(O)—O—CH$_2$—CH$_2$—OH) using zirconium(IV) acetylacetonate (cf. 17):

121.9 g of 2-hydroxyethyl acrylate are heated to 110° C. in a four-neck flask equipped with stirrer, intensive cooler, thermometer and dropping funnel, together with 0.081 g (200 ppm) of zirconium(IV) acetylacetonate and 300 ppm of methylhydroquinone. When the temperature has been attained, 285.5 g of internally Si—H-functionalized polydimethylsiloxane (x=13, y=5, R' and R"=Me) of the general formula Me$_3$SiO(SiHMe$_2$O)$_5$(SiMe$_2$O)$_{13}$SiMe$_3$ (SiH value; 0.353%) are added dropwise within 20 minutes. One hour after completion of addition and cooling, the conversion, according to the SiH value method, was 0%.

9. Attempted reaction of an internally Si—H-functional siloxane (x=63.5, y=6.5, R' and R"=Me) with a polypropylene oxide polyether using manganese(II) acetate (cf. 18):

40.0 g of a butanol-started polypropylene oxide polyether (average molar mass 1800 g/mol) are heated to 120° C. in a four-neck flask equipped with stirrer, reflux condenser, thermometer and dropping funnel, together with 0.01 g of manganese(II) acetate (200 ppm). After the temperature has been attained, 14.5 g of internally Si—H-functionalized polydimethylsiloxane (x=63.5, y=6.5, R' and R"=Me) of the general formula Me$_3$SiO(SiHMeO)$_{6.5}$(SiMe$_2$O)$_{63.5}$SiMe$_3$ (SiH value: 0.13%) are added dropwise within 20 minutes. Four hours after completion of addition and cooling, according to the SiH value method, no conversion can be detected.

Inventive Examples

10. Reaction of a terminally Si—H-functional siloxane (x=7.2, y=0, R' and R"=H) with Isofol 12 (Sasol) using tris(pentafluorophenyl)borane and the synergistically active compound titanium(IV) isopropoxide (cf. 1b):

37.4 g of Isofol 12 (Sasol) and 0.02 g of titanium(IV) isopropoxide (200 ppm) are heated to 120° C. in a four-neck flask equipped with stirrer, intensive cooler, thermometer and dropping funnel, together with 0.002 g (20 ppm) of tris(pentafluorophenyl)borane. When the temperature has been attained, 62.6 g of terminally Si—H-functionalized polydimethylsiloxane (x=7.2, y=0, R' and R"=H) of the general formula HMe$_2$SiO(SiMe$_2$O)$_{7.2}$SiMe$_2$H (SiH value: 0.302%) are added dropwise within 20 minutes. One hour after completion of addition and cooling, the conversion, according to the SiH value method, was 100%.

After the volatile compounds have been distilled off, a pale yellow, clear liquid is obtained.

11. Reaction of a terminally Si—H-functional siloxane (x=7.2, y=0, R' and R"=H) with Isofol 12 (Sasol) using tris(pentafluorophenyl)borane and the synergistically active compound iron(II) chloride hydrate (cf. 1b):

37.4 g of Isofol 12 (Sasol) and 0.005 g (50 ppm) of iron(II) chloride hydrate are heated to 120° C. in a four-neck flask equipped with stirrer, intensive cooler, thermometer and dropping funnel, together with 0.002 g (20 ppm) of tris(pentafluorophenyl)borane. When the temperature has been attained, 62.6 g of terminally Si—H-functionalized polydimethylsiloxane (x=7.2, y=0, R' and R"=H) of the general formula HMe$_2$SiO(SiMe$_2$O)$_{7.2}$SiMe$_2$H (SiH value: 0.302%) are added dropwise within 20 minutes. One hour after completion of addition and cooling, the conversion, according to the SiH value method, was 100%.

After the volatile compounds have been distilled off, a pale yellow, clear liquid is obtained.

12. Reaction of a terminally Si—H-functional siloxane (x=13, y=0, R' and R"=H) with a polypropylene oxide polyether using tris(pentafluorophenyl)borane and the synergistically active compound palladium(II) acetate (cf. 2b):

62.0 g of a butanol-started polypropylene oxide polyether (average molar mass 1800 g/mol) and 0.016 g of palladium(II) acetate (200 ppm) are initially charged in a four-neck flask equipped with stirrer, intensive cooler, thermometer and dropping funnel, 0.0008 g (10 ppm) of tris(pentafluorophenyl)borane are added and the mixture is subsequently heated to 120° C. When the temperature has been attained, 18.0 g of terminally Si—H-functionalized polydimethylsiloxane (x=13, y=0, R' and R"=H) of the general formula HMe$_2$SiO(SiMe$_2$O)$_{13}$SiMe$_2$H (SiH value: 0.18%) are added dropwise within 20 minutes. One hour after completion of addition and cooling, the conversion, according to the SiH value method, was 100%.

After the heterogeneous palladium(II) acetate has been removed by means of filtration, a clear liquid is obtained.

13. Reaction of an internally Si—H-functional siloxane (x=13, y=5, R' and R"=Me) with 2-ethylhexanol (Fluka) using tris(pentafluorophenyl)borane and the synergistically active compound tin(II) chloride hydrate (cf. 3b):

32.5 g of 2-ethylhexanol (Fluka) and 0.02 g (200 ppm) of tin(II) chloride hydrate are initially charged in a four-neck flask equipped with stirrer, intensive cooler, thermometer and dropping funnel, 0.006 g (60 ppm) of tris(pentafluorophenyl)borane are added and the mixture is subsequently heated to 120° C. When the temperature has been attained, 67.5 g of internally Si—H-functionalized polydimethylsiloxane (x=13, y=5, R' and R"=Me) of the general formula Me$_3$SiO(SiHMeO)5(SiMe$_2$O)$_{13}$SiMe$_3$ (SiH value: 0.353%) are added dropwise within 20 minutes. One hour after completion of addition and cooling, the conversion, according to the SiH value method, was 100%.

After the volatile compounds have been distilled off, a colorless, clear liquid is obtained.

14. Reaction of an internally Si—H-functional siloxane (x=13, y=5, R' and R"=Me) with 2-ethylhexanol (Fluka) using tris(pentafluorophenyl)borane and the synergistically active compound zirconium(IV) chloride (cf. 3b):

32.5 g of 2-ethylhexanol (Fluka) and 0.02 g (200 ppm) of zirconium(IV) chloride are initially charged in a four-neck flask equipped with stirrer, intensive cooler, thermometer and dropping funnel, 0.006 g (60 ppm) of tris(pentafluorophenyl)borane are added and the mixture is subsequently heated to 120° C. When the temperature has been attained, 67.5 g of internally Si—H-functionalized polydimethylsiloxane (x=13, y=5, R' and R"=Me) of the general formula Me$_3$SiO(SiHMeO)$_5$(SiMe$_2$O)$_{13}$SiMe$_3$ (SiH value: 0.353%) are added dropwise within 20 minutes. One hour after completion of addition and cooling, the conversion, according to the SiH value method, was 100%.

After the volatile compounds have been distilled off, a colorless, clear liquid is obtained.

15. Reaction of an internally Si—H-functional siloxane (x=13, y=5, R' and R"=Me) with 2-hydroxyethyl acrylate (CH$_2$=CH—C(O)—O—CH$_2$—CH$_2$—OH) using tris(pentafluorophenyl)borane and the synergistically active compound chromium(III) chloride (cf. 4b):

121.9 g of 2-hydroxyethyl acrylate are heated to 110° C. in a four-neck flask equipped with stirrer, intensive cooler, thermometer and dropping funnel, together with 0.115 g (282 ppm) of tris(pentafluorophenyl)borane, 0.081 g (200 ppm) of chromium(III) chloride and 300 ppm of methylhydroquinone. When the temperature has been attained, 285.5 g of internally Si—H-functionalized polydimethylsiloxane (x=13, y=5, R' and R"=Me) of the general formula Me$_3$SiO(SiHMeO)5(SiMe$_2$O)$_{13}$SiMe$_3$ (SiH value: 0.353%) are added dropwise within 20 minutes. One hour after completion of addition and cooling, the conversion, according to the SiH value method, was 100%.

After the heterogeneous chromium(III) chloride has been removed by means of filtration and the volatile compounds have subsequently been distilled off, a colorless, clear liquid is obtained.

16. Reaction of an internally Si—H-functional siloxane (x=13, y=5, R' and R"=Me) with 2-hydroxyethyl acrylate (CH$_2$=CH—C(O)—O—CH$_2$—CH$_2$—OH) using tris(pentafluorophenyl)borane and the synergistically active compound nickel(II) sulfate (cf. 4b):

121.9 g of 2-hydroxyethyl acrylate are heated to 110° C. in a four-neck flask equipped with stirrer, intensive cooler, thermometer and dropping funnel, together with 0.19 g (466 ppm) of tris(pentafluorophenyl)borane, 0.081 g (200 ppm) of nickel(II) sulfate and 300 ppm of methylhydroquinone. When the temperature has been attained, 285.5 g of internally Si—H-functionalized polydimethylsiloxane (x=13, y=5, R' and R"=Me) of the general formula Me$_3$SiO(SiHMeO)$_5$(SiMe$_2$O)$_{13}$SiMe$_3$ (SiH value: 0.353%) are added dropwise within 20 minutes. One hour after completion of addition and cooling, the conversion, according to the SiH value method, was 100%.

After the heterogeneous nickel(II) sulfate has been removed by means of filtration and the volatile compounds have subsequently been distilled off, a colorless, clear liquid is obtained.

17. Reaction of an internally Si—H-functional siloxane (x=13, y=5, R' and R"=Me) with 2-hydroxyethyl acrylate (CH$_2$=CH—C(O)—O—CH$_2$—CH$_2$—OH) using tris(pentafluorophenyl)borane and the synergistically active compound zirconium(IV) acetyl acetonate (cf. 4b or 8):

121.9 g of 2-hydroxyethyl acrylate are heated to 110° C. in a four-neck flask equipped with stirrer, intensive cooler, thermometer and dropping funnel, together with 0.148 g (385 ppm) of tris(pentafluorophenyl)borane, 0.081 g (200 ppm) of zirconium(IV) acetyl acetonate and 300 ppm of methylhydroquinone. When the temperature has been attained, 285.5 g of internally Si—H-functionalized polydimethylsiloxane (x=13, y=5, R' and R"=Me) of the general formula Me$_3$SiO(SiHMeO)5(SiMe$_2$O)$_{13}$SiMe$_3$ (SiH value: 0.353%) are added dropwise within 20 minutes. One hour after completion of addition and cooling, the conversion, according to the SiH value method, was 100%.

After the volatile compounds have been distilled off, a colorless, clear liquid is obtained.

18. Reaction of an internally Si—H-functional siloxane (x=63.5, y=6.5, R' and R"=Me) with a polypropylene oxide polyether using tris(pentafluorophenyl)borane and the synergistically active compound manganese(II) acetate (cf. 5b or 9):

40.0 g of a butanol-started polypropylene oxide polyether (average molar mass 1800 g/mol) and 0.011 g of manganese(II) acetate (200 ppm) are heated to 120° C. in a four-neck flask equipped with stirrer, reflux condenser, thermometer and dropping funnel, together with 0.007 g (120 ppm) of tris(pentafluorophenyl)borane catalyst. After the temperature has been attained, 14.5 g of internally Si—H-functionalized polydimethylsiloxane (x=63.5, y=6.5, R' and R"=Me) of the general formula Me$_3$SiO(SiHMeO)$_{6.5}$(SiMe$_2$O)$_{63.5}$SiMe$_3$ (SiH value: 0.13%) are added dropwise within 20 minutes. One hour after completion of addition and cooling, the conversion, according to the SiH value method, was 100%.

19. Reaction of an internally Si—H-functionalized siloxane (x=63.5, y=6.5, R' and R"=Me) with a polyether which is composed of propylene oxide and ethylene oxide, using tris(pentafluorophenyl)borane and the synergistically active compound iron(III) chloride (cf. 6):

40.8 g of a butanol-started polyether (average molar mass 1400 g/mol) which contains 58% propylene oxide (remainder ethylene oxide) and 0.006 g or iron(III) chloride (100 ppm) are heated to 120° C. in a four-neck flask equipped with stirrer, reflux condenser, thermometer and dropping funnel, together with 0.012 g (300 ppm) of tris(pentafluorophenyl)borane catalyst. After the temperature has been attained, 20.0 g of internally Si—H-functionalized polydimethylsiloxane (x=63.5, y=6.5, R' and R"=Me) of the general formula Me$_3$SiO(SiHMeO)$_{6.5}$(SiMe$_2$O)$_{63.5}$SiMe$_3$ (SiH value: 0.13%) are added dropwise within 20 minutes. Three hours after completion of addition and cooling, the conversion, according to the SiH value method, was 100%.

20. Reaction of an internally Si—H-functionalized siloxane (x=63.5, y=6.5, R' and R"=Me) with a polyether which is composed of propylene oxide and ethylene oxide, using tris(pentafluorophenyl)borane and the synergistically active compound iron(III) chloride hexahydrate (cf. 7):

85.0 g of a butanol-started polyether (average molar mass 4400 g/mol) which contains 58% propylene oxide (remainder ethylene oxide) and 0.015 g of iron(III) chloride hexahydrate (150 ppm) are heated to 120° C. in a four-neck flask equipped with stirrer, reflux condenser, thermometer and dropping funnel, together with 0.03 g (300 ppm) of tris(pentafluorophenyl)borane catalyst. After the temperature has been attained, 15.0 g of internally Si—H-functionalized polydimethylsiloxane (x=63.5, y=6.5, R' and R''=Me) of the general formula Me$_3$SiO (SiHMeO)$_{6.5}$(SiMe$_2$O)$_{63.5}$SiMe$_3$ (SiH value: 0.13%) are added dropwise within 20 minutes. One hour after completion of addition and cooling, the conversion, according to the SiH value method, was 100%.

What is claimed is:

1. A catalytic system for the dehydrogenative condensation of polyorganosiloxanes with one or more alcohols:
    wherein the alcohol is selected from the group consisting of linear or branched, saturated, mono- or polyunsaturated, aromatic, fluorinated or perfluorinated, mono- or poly(meth)acrylated, aliphatic-aromatic mono- or polyalcohols, polyether mono- or polyether polyalcohols, amino alcohols, N-alkyl-EO alcohols, N-alkyl-PO alcohols, arylamino-EO alcohols, arylamino-PO alcohols, N-alkyl alcohols, arylamino alcohols and mixtures thereof, wherein each of the alcohols are optionally substituted;
    and the polyorganosiloxanes contain —Si(H) units and are of the formula (I)

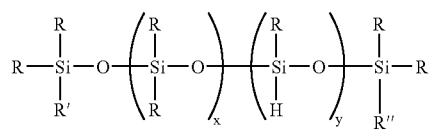

in which
    R represents one or more identical or different radicals selected from linear or branched, saturated, mono- or polyunsaturated alkyl, aryl, alkylaryl or arylalkyl radicals having from 1 to 20 carbon atoms, haloalkyl groups having from 1 to 20 carbon atoms, siloxy groups and triorganosiloxy groups,
    R' and R'' each independently represent H or R,
    x represents an integer from 0 to 300,
    y represents an integer from 0 to 100,
    with the proviso that at least one hydrogen atom bonded to an Si atom is present in the molecule;
    the catalytic system comprising at least one boron compound and at least one synergistically active compound containing anions and cations which is a salt or a complex with cations selected from the group consisting of titanium, zirconium, chromium, manganese, iron, nickel, palladium, and mixtures thereof
    wherein the boron compound is at least one fluorinated and/or nonfluorinated organoboron compound, selected from the group of:
    $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(Ph)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14}B)(C_6F_5)$; $(C_6F_5)_2B(OC_2H_5)$; $(C_6F_5)_2B—CH_2CH_2Si(CH_3)_3$;

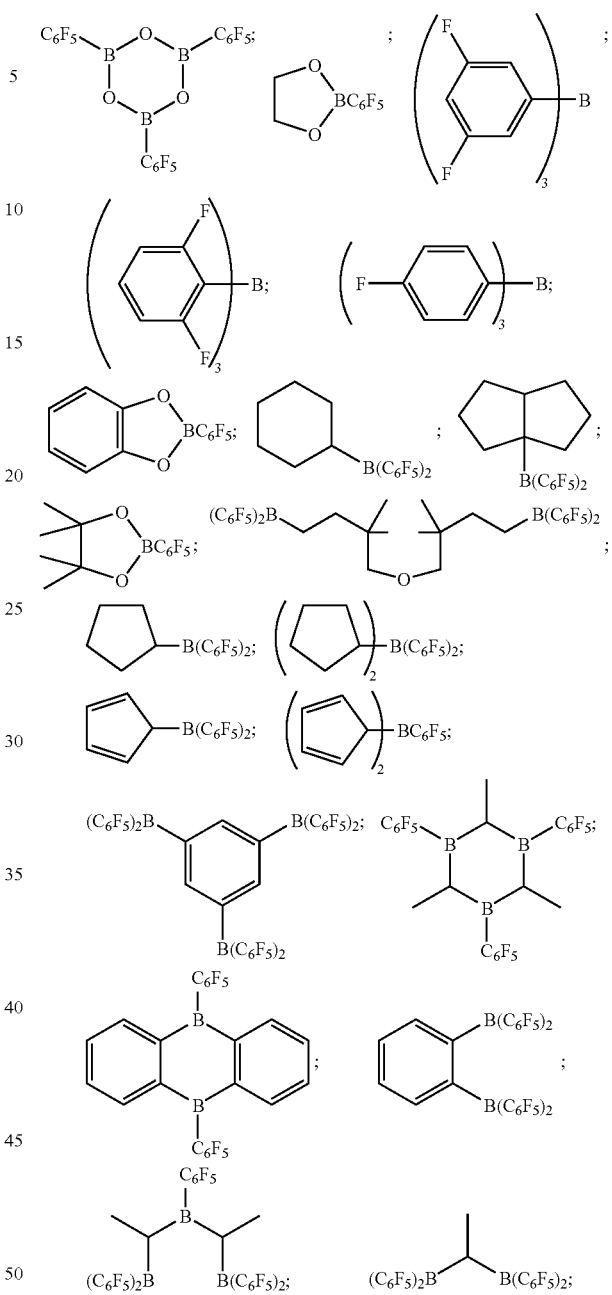

boron trifluoride etherate [109-63-7], borane-triphenylphosphine complex [2049-55-0], triphenylborane [960-71-4], triethylborane [97-94-9], boron trichloride [10294-34-5], di-2,4-cyclopentadien-1-yl(pentafluorophenyl)borane [336881-03-9], (hexahydro-3a(1H)-pentalenyl)bis(pentafluorophenyl)borane [336880-98-9], 1,3-[2-[bis(pentafluorophenyl)boryl]ethyl]tetramethyldisiloxane [336880-99-0], 2,4,6-tris(pentafluorophenyl)borazine [1110-39-0], 1,2-dihydro-2-(pentafluorophenyl)-1,2-azaborine [336880-94-5], 2-(pentafluorophenyl)-1,3,2-benzodioxaborole [336880-96-7], tris(4-trifluoromethoxyphenyl)borane [336880-95-6], methyliumtriphenyl tetrakis(pentafluorophenyl)-borate [136040-19-2], N,N-dimethylanilinium tetrakis(pentafluorophenyl)borate, and mixtures of the above boron compounds.

2. The catalytic system as claimed in claim 1, wherein the at least one synergistically active compound containing anions and cations which is a salt or a complex with cations selected from the group consisting of elements of transition groups VIA, VIIA and VIIIA and non-metal group IVB (old IUPAC system)
wherein the boron compound is at least one fluorinated organoboron compound, selected from the group of:

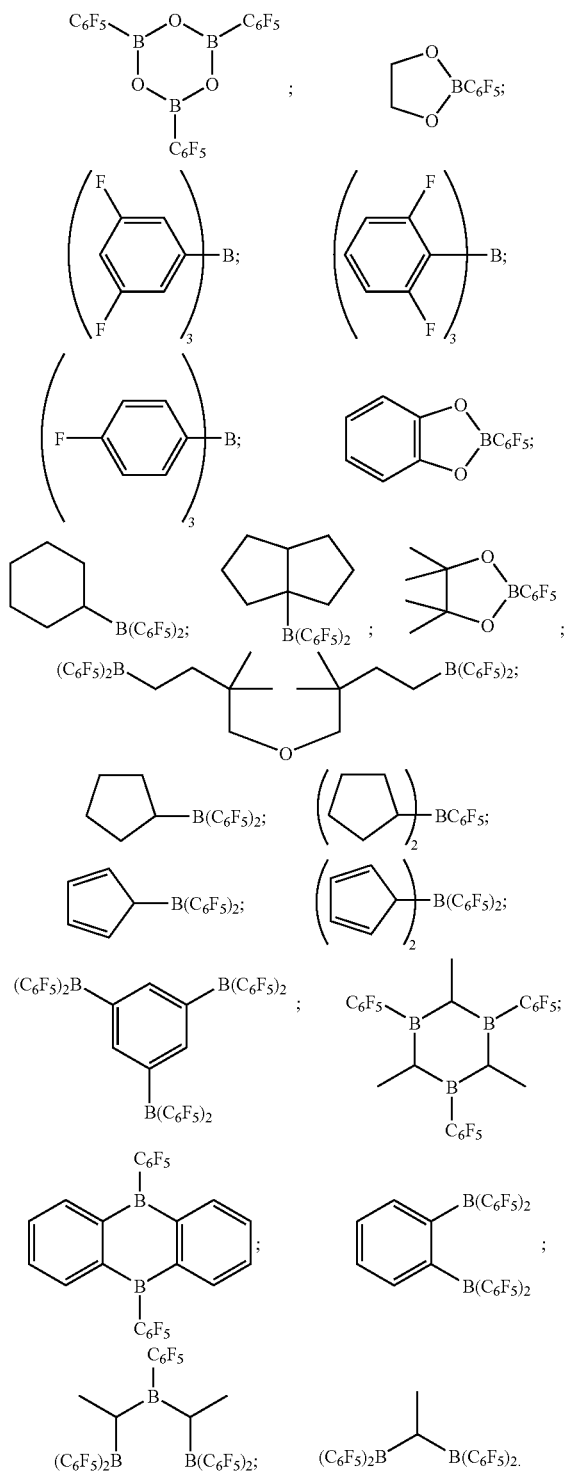

3. The catalytic system as claimed in claim 2, wherein:
the anions of the synergistically active compounds are selected from the group consisting of alkoxylates, acid anions, carboxylates, sulfates, nitrates, phosphates, halides, chlorides, oxides, acetylacetonate and carbonyls;
the cations of the synergistically active compound are selected from the group consisting of titanium, zirconium, chromium, manganese, iron, nickel, palladium, and mixtures thereof;
x represents an integer from 5 to 100; and
y represents an integer from 3 to 30.

4. The catalytic system of claim 1, wherein the boron compound used is tris(pentafluorophenyl)borane.

5. The catalytic system of claim 4, wherein the cations of the synergistically active compound are selected from the group consisting of chromium, manganese, iron, nickel, palladium, and mixtures thereof.

6. The catalytic system of claim 1, wherein the anions of the synergistically active compounds are selected from the group consisting of alkoxylates, acid anions, carboxylates, sulfates, nitrates, phosphates, halides, chlorides, oxides, acetylacetonate and carbonyls.

7. A process for the partial or full reaction of one or more polyorganosiloxanes containing
—Si(H) units and are of the formula (I)

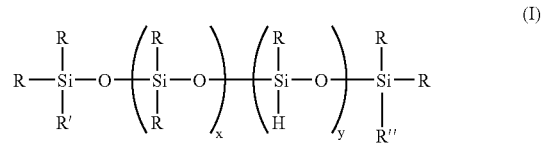

in which
R represents one or more identical or different radicals selected from linear or branched, saturated, mono- or polyunsaturated alkyl, aryl, alkylaryl or arylalkyl radicals having from 1 to 20 carbon atoms, haloalkyl groups having from 1 to 20 carbon atoms, siloxy groups and triorganosiloxy groups,
R' and R" each independently represent H or R,
x represents an integer from 0 to 300,
y represents an integer from 0 to 100,
with the proviso that at least one hydrogen atom bonded to an Si atom is present in the molecule and is substituted with at least one alcohol which is selected from the group consisting of the linear or branched, saturated, mono- or polyunsaturated, aromatic, fluorinated or perfluorinated, mono- or poly(meth)acrylated, aliphatic-aromatic mono- or polyalcohols, polyether mono- or polyether polyalcohols, amino alcohols, N-alkyl-EO alcohols, N-alkyl-PO alcohols, arylamino-EQ alcohols, arylamino-PO alcohols, N-alkyl alcohols, arylamino alcohols;
which comprises replacing the hydrogen present in the Si(H)(R)—O units of the polyorganosiloxane, optionally under inert gas, optionally with use of solvents, partly or fully by alkoxide radicals of the alcohols used, in one process step using the catalytic system of claim 1 at temperatures of from about 70° C. to about 150° C.

8. The process as claimed in claim 7, wherein the alcohol used is at least one compound selected from the group consisting of methanol, ethanol, butyl polyether alcohols, allyl polyether alcohols, nonylphenol polyether alcohols, styrene oxide-containing polyether alcohols, butylene oxide-containing polyether alcohols, mono- or poly(meth)acrylated mono- or polyalcohols, fluorinated or perfluorinated mono- or polyalcohols, and mixtures thereof.

9. The process of claim 7, wherein a ratio of SiH groups to alcohol groups is in the range from about 1:1 to about 1:3 molar equivalents.

10. The process of claim 7, wherein the ratio of SiH groups to alcohol groups is in the range from about 1:0.1 to about 1:0.99 molar equivalents.

11. The process of claim 7, wherein the polyorganosiloxanes used are terminal SiH polyorganosiloxanes.

12. The process of claim 7, wherein the polyorganosiloxanes used are pendant or simultaneously terminal and pendant (mixed) SiH polyorganosiloxanes.

13. The process of claim 7 wherein the polysiloxanes used are compounds selected from the group of the comblike, α,ω-disubstituted and mixed polydimethylhydrosiloxanes of formula (I).

14. The process as claimed in claim 13, wherein polyorganosiloxanes are used which are selected from the group of formula (III)

M'-O-D$_x$-M'  (III)

in which
M' is selected from the group consisting of dialkyl(hydro)silyl and dimethylhydrosilyl, and
D is selected from the group consisting of dialkylsilyloxy and dimethylsilyloxy.

15. The process as claimed in claim 13, wherein polyorganosiloxanes are used which are selected from the group of the formula (II)

M-O-D$_x$-D'$_y$-M  (II)

where
M is selected from the group consisting of trialkylsilyl and trimethylsilyl,
D is selected from the group consisting of dialkylsilyloxy and dimethylsilyloxy, and
D' is

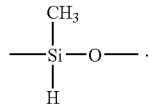

x is 5 to 100; and
y is 3 to 30.

16. The process of claim 7, wherein polyorganosiloxanes are used which are selected from the group of the formula (IV)

M'-O-D$_x$-D'$_y$-M'  (IV)

where
M' is selected from the group consisting of dialkyl(hydro)silyl and dimethylhydrosilyl,
D is selected from the group consisting of dialkylsilyloxy and dimethylsilyloxy, and
D' is

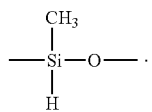

17. The process of claim 7, wherein the reaction is carried out without solvent.

18. The process of claim 7, wherein a hydrosilylation has already been carried out with a proportion of the hydrogen atoms of the SiH siloxane.

19. The process of claim 7, wherein:
the alcohol used is at least one compound selected from the group consisting of methanol, ethanol, butyl polyether alcohols, allyl polyether alcohols, nonylphenol polyether alcohols, styrene oxide-containing polyether alcohols, butylene oxide-containing polyether alcohols, mono- or poly(meth)acrylated mono- or polyalcohols, fluorinated or perfluorinated mono- or polyalcohols, and mixtures thereof;
a ratio of SiH groups to alcohol groups is in the range from about 1:1 to about 1:3 molar equivalents;
the reaction is carried out without solvent;
x represents an integer from 5 to 100; and
y represents an integer from 3 to 30.

20. The process of claim 7, wherein:
the alcohol used is at least one compound selected from the group consisting of methanol, ethanol, butyl polyether alcohols, allyl polyether alcohols, nonylphenol polyether alcohols, styrene oxide-containing polyether alcohols, butylene oxide-containing polyether alcohols, mono- or poly(meth)acrylated mono- or polyalcohols, fluorinated or perfluorinated mono- or polyalcohols, and mixtures thereof;
a ratio of SiH groups to alcohol groups is in the range from about 1:0.1 to about 1:0.99 molar equivalents;
the reaction is carried out without solvent;
x represents an integer from 5 to 100; and
y represents integer from 3 to 30.

* * * * *